United States Patent [19]

Welch

[11] 3,839,206

[45] Oct. 1, 1974

[54] PROCESS FOR REMOVING POLLUTANTS FROM LIQUIDS

[75] Inventor: Richard M. Welch, Churchville, Pa.

[73] Assignee: Liquid Waste Conversion Corporation, Churchville, Pa.

[22] Filed: Apr. 2, 1973

[21] Appl. No.: 347,121

[52] U.S. Cl. ............................... 210/259, 210/321
[51] Int. Cl. .......................................... B01d 31/00
[58] Field of Search ......... 210/512, 73, 44, 23, 304, 210/321, 301, 259

[56] References Cited
UNITED STATES PATENTS

| | | | |
|---|---|---|---|
| 1,162,624 | 11/1915 | Linden | 210/301 X |
| 2,217,143 | 10/1940 | Stevenson | 210/44 |
| 2,277,651 | 3/1942 | Steele | 210/512 X |
| 3,313,795 | 4/1967 | Rubin | 210/44 X |

OTHER PUBLICATIONS

Gouveia et al., "Potable Water from Hospital Wastes by Reverse Osmosis", from Chemical Engineering Progress, Vol. 64, No. 90, 1968, pages 280–284 relied on.

Primary Examiner—Frank A. Spear, Jr.
Attorney, Agent, or Firm—Arthur A. Jacobs

[57] ABSTRACT

The treatment of waste water by the application of polyelectrolytes to the waste water to remove dispersed and dissolved waste particles and then subjecting the resultant treated or clarified solution to reverse osmosis to further remove dissolved particles therefrom.

7 Claims, 3 Drawing Figures

PATENTED OCT 1 1974 3,839,206

PROCESS FOR REMOVING POLLUTANTS FROM LIQUIDS

This invention relates to the treatment of industrial waste to remove these wastes from water, and it particularly relates to a treatment of the aforesaid type utilizing the process of reverse osmosis.

One of the primary ecological problems today is the removal of waste material from polluted water to prevent or inhibit pollution of streams, rivers, lakes, and the like. Although many different types of treatments have been attempted or are now in use, these treatments are generally highly complex and expensive and often require the use of large tracts of land which could otherwise be utilized for better purposes.

It is an object of the present invention to provide a method of treatment for polluted waters which is relatively simple and inexpensive and which avoids the necessity for utilizing large tracts of land.

Another object of the present invention is to provide a method of treatment of the aforesaid type which is generally more effective than other treatments in that it not only removes the ordinary type of pollutants but even dissolved particles of less than molcular size as well as microorganisms such as bacteria, fungi, algae and even viruses.

Other objects and many of the attendant advantages of this invention will be readily appreciated as the same becomes better understood by reference to the following description when read in conjunction with the accompanying drawings wherein.

Figure 1:
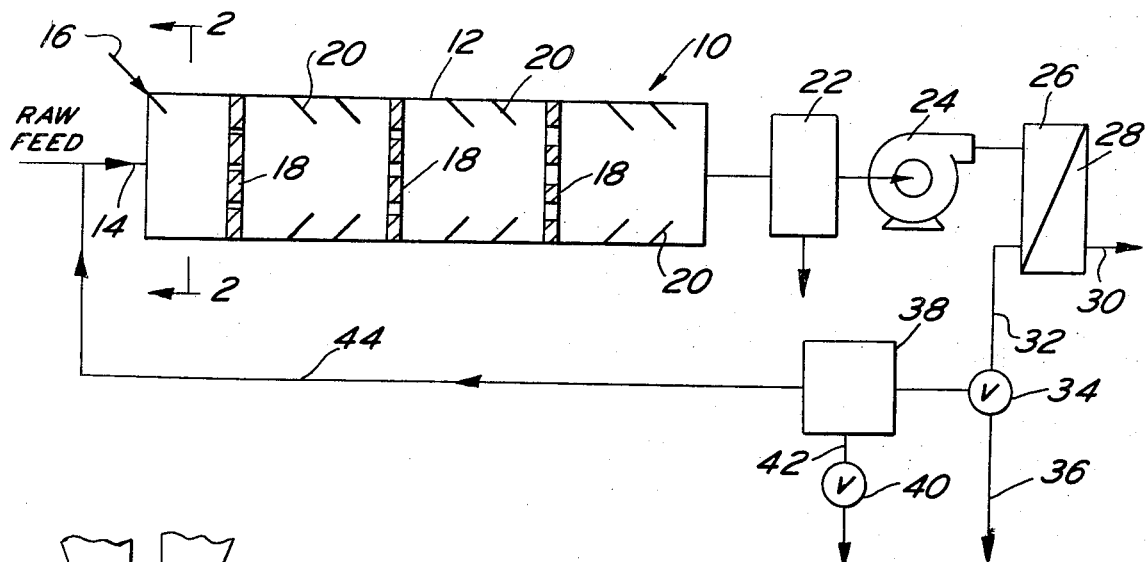
FIG. 1 is a diagramatic view of a system embodying the present invention.

In accordance with the present invention, the sewage or industrial waste liquid is pre-treated to remove the larger solids by flocculation, after which the effluent is passed into a reverse osmosis chamber where the dissolved microscopic particles are removed. The purified water is then either passed into the sewage system or is utilized for other purposes.

The term "reverse osmosis" is applied to a process wherein pressure is applied to a concentrate on one side of a semi-permeable membrane to force the entraining liquid through the pores of the membrane while the entrained material is retained on the other side of the membrane. It is called "reverse osmosis" because "osmosis" is defined as the passage of a liquid from a dilute to a more concentrated solution through the membrane, whereas "reverse osmosis" uses the same principle but, by applying pressure to the concentrated solution, forces flow of the permeate liquid in the reverse direction. Generally, these reverse osmosis membranes are constructed of cellulose-acetate. Cellulose-acetate is a highly organized polymer having groups that can hydrogen bond to water or other solvents subject to hydrogen bonding such as ammonia or alcohols. The liquid molecules can hydrogen bond to the carbonyl groups in the cellulose-acetate, but ions and non-hydrogen bonding substances cannot enter the organic matrix. The liquid molecules that enter the polymer by hydrogen bonding to it can move from one set of hydrogen-bonding sites to another and thereby be transported through the polymer if there is a driving force sufficient to cause transfer. The resistance to transfer is quite high, but high fluxes through such membranes are achieved by making the effective thicknesses of the membranes extremely small. A highly effective membrane is one made by casting anisotropic cellulose-acetate films with an extremely thin layer or "skin" (about 0.25 mm. thick) on top of a thicker layer or substructure (about 99.75 mm. thick) that has an open cellular structure with little resistance to transfer of water or other solvents.

The pressure applied to the concentrate must be sufficient to overcome the osmotic pressure of the concentrated solution in order to force the liquid through the membrane. The osmotic pressure of a solution increases by approximately 0.01 psi for each ppm of TDS. For example, sea water contains an average of 35,000 ppm. of TDS. This means that a pressure of about 351 psi would be required to start even a slow flow of water through the membrane. Where the contaminants in the concentrate result in a higher osmotic pressure, a correspondingly higher applied pressure would be required.

In order for the reverse osmosis system to operate most effectively, it is important to avoid overloading of the concentrate, not only with suspended materials of relatively large particle size but with dissolved particles of smaller size which ordinarily would be present in the concentrate. Generally, the concentration of dissolved solids should be no greater than about 5 percent. For this reason, the present system utilizes a pretreatment wherein the larger dissolved particles are tied up in the suspended particles and are removed with these suspended particles prior to passage of the liquid to the reverse osmosis chamber. Generally, the suspended particles are removed by standard flocculation and clarification steps utilizing large flocculation chambers with paddles or the like to form "floc" and then passing the floc through one or more clarifying chambers where the floc is permitted to settle while the clarified liquid flows on. The use of these flocculation and clarifying chambers requires the utilization of large areas and the passage of long periods of time for the treatments. In addition, they do not provide for the entrainment of the dissolved particles in the suspended material.

In the present system, a simple but highly effective flocculation device is utilized, which not only requires a relatively small space, but operates rapidly, in a continuous stream with the reverse osmosis process, and simultaneously entrains a large portion of the dissolved particles in the suspended material.

Referring now in greater detail to the drawings wherein similar reference characters refer to similar parts, there is shown in FIG. 1 a system, generally designated 10, comprising a tubular flocculating chamber 12. The chamber 12 may vary in length depending on the material being processed and the type of product desired. Generally, for the treatment of sludge or industrial waste, it is about 30 to 40 feet in length.

The chamber 12 is provided with a raw sludge or other waste material inlet at 14 to provide an axial flow of this feed through the chamber. There are also provided one or more tangential inlets 16. The inlets 16 are used to supply chemical flocculant agents, such as polyethylene amines, polyacrylamides. or the like. In this respect, it is important that these flocculating agents do not affect the pH of the raw feed because the pH must remain in the range of about 6 to 7 in order not to deleteriously affect the reverse osmosis membrane.

Within the chamber 12 are one or more perforated plates 18 (three being illustrated for exemplification). The plates 18 have successively larger perforations (as they extend from the left as shown in FIG. 1). Between the plates 18 are provided a plurality of inclined baffles 20.

In operation, as the raw feed passes into the chamber 12 from inlet 14, the flocculating agents pass into the chamber from inlets 16 in a tangential direction. The tangential stream serves to helically whirl the raw feed and entrained flocculants around in a vortex action as they pass longitudinally through the chamber 12. The perforated plates 18 and baffles 20, in combination with the whirling movement of the stream, result in a large degree of turbulence and agitation of the stream. This agitation causes flocculation in the same manner as the standard paddles usually used in flocculating chambers. However, the stream remains in constant linear motion without interruption and discontinuous intervals such as are required by the ordinary flocculating chambers. Furthermore, there are no expensive moving parts that require constant attention and maintenance. The successive plates 18 have successively larger perforations in order not to break up the floc already formed during prior passage through the chamber.

As the floc is formed by the agitation and flocculating agents in chamber 12, the larger dissolved particles are entrapped by or adhere to the floc, whereby when the floc is removed, these dissolved particles are removed with it. This removal occurs as the stream passes into a filter chamber 22. In this filter chamber the floc is filtered out in the standard manner, as by filter screens of desired mesh, and the filtrate passes through pump 24 to the reverse osmosis chamber 26. In this respect, the pump 24 not only serves to draw the raw feed through the flocculating chamber 12 and filter chamber 22 but also supplies the necessary pressure required for the effective operation of the reverse osmosis process in chamber 26.

The filtrate from chamber 22 then passes into chamber 26 and reverse osmosis takes place through membrane 28. The resultant purified liquid passes through outlet 30 either to the sewage system or to use for other purposes. The concentrate remaining on the inlet side of membrane 28 passes through outlet 32 in which is interposed a selector valve 34. The valve 34 may be positioned either to permit the concentrate to flow to a disposal area through line 36 or to pass the concentrate to a settling chamber or the like indicated at 38. The heavier bulk material may then settle or precipitate out and be passed to disposal through a valve 40 in outlet line 42, while the remaining liquid is recycled back through line 44 into the inlet 14 for a further pass through the system.

Figure 3:
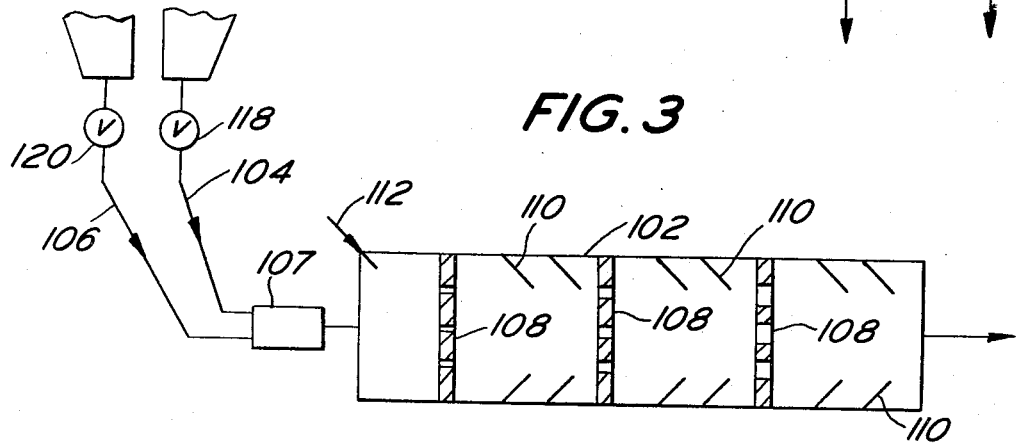
FIG. 3 is a diagramatic view of part of a modified form of the system of FIG. 1.
Figure 2:
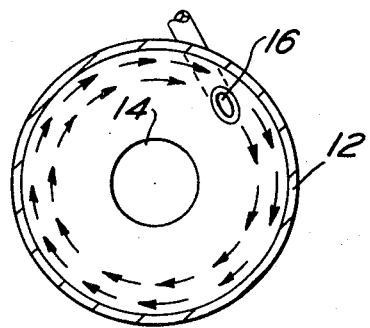
FIG. 2 is a sectional view taken on line 2—2 of FIG. 1.

In FIG. 3 is shown a modification of the system of FIG. 1 wherein instead of passing a single stream of waste material through the chamber 102, similar to chamber 12, two different types of waste, one alkaline and one acid in nature, are passed through respective lines 104 and 106 and merged in chamber 107 so that the stream entering chamber 102 is substantially neutral in pH. Here, too, the flocculating agents are inserted tangentially into chamber 102 by means of one or more tangential inlets 112.

The inlets 104 and 106 may be connected directly to their respective sources of waste or they may be connected to separate holding tanks 114 and 116 with appropriate control valves, as at 118 and 120 interposed therein. In this manner, by use of the valves 118 and 120 in conjunction with appropriate pH meters (not shown) the proportions of the two streams may be regulated to control the resultant pH of the material in chamber 106.

The invention claimed is:

1. A system for removing contaminants from waste water comprising a flocculating chamber having an inlet for receiving waste water and an outlet in fluid connection with a filter unit, said filter unit being constructed and arranged to filter out the floc formed in said flocculating chamber, said filter unit being in fluid connection with a reverse osmosis chamber for passage thereto of the filtrate from said filter unit, said filtrate constituting a concentrated solution, said reverse osmosis chamber having a reverse osmosis membrane dividing it into inlet and outlet sections, means to apply predetermined pressure to said concentrated solution in said inlet section, and outlet means in said outlet section for removal of the filtrate resulting from passage through said membrane, said flocculating chamber comprising a tubular housing having baffle means therein, waste water inlet means in said flocculating chamber, said waste water inlet means being in the axial plane of said flocculating chamber, and a flocculating agent inlet which is tangential to the axis of said flocculating chamber, said flocculating agent inlet providing a substantially helical flow of the waste water and matter entrained therein in the general axial direction of said flocculating chamber.

2. The system of claim 1 wherein said concentrate is recycled for further passage through said flocculating chamber.

3. The system of claim 1 wherein said flocculating chamber is constructed and arranged to provide continuous flow therethrough to the reverse osmosis chamber in stream therewith.

4. The system of claim 1 wherein spaced perforated plates are provided in said flocculating chamber, said plates having successively larger apertures as they are situated closer to the outlet end of said chamber.

5. The system of claim 1 wherein said means to apply pressure comprises a pump, said pump also serving to simultaneously pass said concentrated solution to said reverse osmosis chamber.

6. The system of claim 1 wherein supply means for supplying waste water to said flocculating chamber comprise at least two separate sources, each source containing waste water of a different pH value.

7. The system of claim 6 wherein means are provided for adjusting flow from said sources to obtain a predetermined pH value.

* * * * *